(12) United States Patent
Charles et al.

(10) Patent No.: US 9,965,827 B2
(45) Date of Patent: May 8, 2018

(54) GRAPHICS PROCESSING SYSTEM FOR AND METHOD OF STORING AND QUERYING VERTEX ATTRIBUTE DATA IN A CACHE

(71) Applicant: ARM Limited, Cambridge (GB)

(72) Inventors: Simon Charles, Cambridge (GB); Andreas Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 285 days.

(21) Appl. No.: 14/796,979

(22) Filed: Jul. 10, 2015

(65) Prior Publication Data

US 2016/0196633 A1    Jul. 7, 2016

(30) Foreign Application Priority Data

Jul. 14, 2014    (GB) .................................... 1412511.6

(51) Int. Cl.
*G06T 1/60*    (2006.01)
*G06T 1/20*    (2006.01)
(Continued)

(52) U.S. Cl.
CPC ................ *G06T 1/60* (2013.01); *G06F 12/02* (2013.01); *G06F 12/0864* (2013.01);
(Continued)

(58) Field of Classification Search
None
See application file for complete search history.

(56) References Cited

U.S. PATENT DOCUMENTS 6,353,438 B1    3/2002    Van Hook
6,690,380 B1 *  2/2004    Hussain .............. G06F 12/0875
                                                            345/557

(Continued)

FOREIGN PATENT DOCUMENTS

EP    1 096 427 A2 *    5/2001    ............. G06T 15/00
EP    1096427              5/2001
EP    2615578              7/2013

OTHER PUBLICATIONS

Search Report dated Jan. 15, 2015, UK Patent Application No. GB 1412511.6.

*Primary Examiner* — Maurice L McDowell, Jr.
*Assistant Examiner* — Donna J Ricks
(74) *Attorney, Agent, or Firm* — Vierra Magen Marcus LLP (57) ABSTRACT

A graphics processing system for processing polygons includes a cache with cache lines for storing data entries, each line having a tag for identifying the data stored in the line. The polygons have vertices with which pieces of vertex attribute data are associated. The system also includes processing circuitry which writes, to a line in a first set of lines, data entries associated with pieces of vertex attribute data. The pieces of vertex attribute data are associated with the vertices of a polygon. The processing circuitry also writes a tag including a polygon identifier to identify the polygon associated with the data entries to the line in the first set of lines, and writes, to a second set of lines of the cache, data entries associated with pieces of vertex attribute data. The processing circuitry also writes tags including vertex identifiers to the second set of lines to identify the vertices associated with the data entries.

22 Claims, 4 Drawing Sheets

(51) Int. Cl.
  *G06F 12/08* (2016.01)
  *G06F 12/12* (2016.01)
  *G06F 12/02* (2006.01)
  *G06F 12/0864* (2016.01)
  *G06F 12/0895* (2016.01)
  *G06F 12/128* (2016.01)

(52) U.S. Cl.
  CPC ........ *G06F 12/0895* (2013.01); *G06F 12/128* (2013.01); *G06T 1/20* (2013.01); *G06F 2212/6032* (2013.04); *G06F 2212/621* (2013.01)

(56) References Cited

U.S. PATENT DOCUMENTS

| | | |
|---|---|---|
| 2003/0142100 A1 | 7/2003 | Lavelle |
| 2003/0151602 A1* | 8/2003 | Sadowsky ............. G06T 15/005 345/419 |
| 2010/0149202 A1 | 6/2010 | Yoshikawa |
| 2013/0097386 A1* | 4/2013 | Lee .................... G06F 12/0864 711/128 |

* cited by examiner

GRAPHICS PROCESSING SYSTEM FOR AND METHOD OF STORING AND QUERYING VERTEX ATTRIBUTE DATA IN A CACHE

BACKGROUND

The technology described herein relates to graphics processing systems, and in particular to the operation of graphics processing systems that include a cache.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles and quadrilaterals.

The graphics primitives are usually generated by the applications program interface for the graphics processing system, using the graphics drawing instructions (requests) received from the application (e.g. game) that requires the graphics output.

Each primitive at this stage is usually defined by and represented as a set of vertices. Each vertex for a primitive will have associated with it a set of attribute values (such as position, colour, texture coordinates and other such attributes) representing those attributes (properties) of the primitive at the vertex in question. This attributes data is then used, for example, when rasterising and rendering the primitive(s) that uses (that includes) the vertex in order to generate the desired output of the graphics processing system.

Once primitives and their vertices have been generated and defined, they can be processed by the graphics processing system, in order, for example, to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point.

These processes, as well as other processes in the graphics processing system, use the attributes data associated with the vertices, for example, to determine an attribute (e.g. colour) value for each sampling point covered by a primitive. Commonly the attribute values are determined for a given sampling point by performing linear interpolation of the attribute values for the vertices associated with the primitive that the sampling point represents.

To avoid a request being made to main memory each time vertex attribute data is required, recently used attribute data for vertices may be held locally in a cache. Typically, a copy of the most recently used data stored in main memory will be stored in the cache, locally to where it is required, so that if subsequent request is made for the data, it can be accessed quickly and efficiently, e.g. consuming little power.

The Applicants believe that there remains scope for improvements to the organisation and handling of caches in graphics processing systems.

BRIEF DESCRIPTION OF THE DRAWINGS

An embodiment of the technology described herein will now be described, by way of example only and with reference to the accompanying drawings, in which.

DETAILED DESCRIPTION

One embodiment of the technology described herein comprises a method of storing a plurality of pieces of vertex attribute data in a graphics processing system, the graphics processing system being arranged to process a plurality of polygons, the plurality of polygons comprising a plurality of vertices with which the plurality of pieces of vertex attribute data are associated, the method comprising:

writing, to a line in a first set of lines of a cache, a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries; and/or for the plurality of pieces of vertex attribute data that the line in the first set of lines in the cache relates to, writing, to a line in a second set of lines of the cache, a data entry associated with a piece of vertex attribute data, the piece of vertex attribute data being associated with one of the vertices of the polygon that the line in the first set of lines in the cache relates to, and a tag comprising a vertex identifier to identify the vertex associated with the data entry.

Another embodiment of the technology described herein comprises a graphics processing system for processing a plurality of polygons, the plurality of polygons comprising a plurality of vertices with which a plurality of pieces of vertex attribute data are associated, wherein the graphics processing system comprises:

a cache comprising a plurality of cache lines each for the storage of data entries, and each having a tag for identifying the data stored in the cache line; and processing circuitry arranged to:
write, to a line in a first set of lines of the cache, a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries; and to:
write, to a line in a second set of lines of the cache, a data entry associated with a piece of vertex attribute data, the piece of vertex attribute data being associated with one of the vertices of a polygon, and a tag comprising a vertex identifier to identify the vertex associated with the data entry.

The technology described herein relates to the caching of vertex attribute data in graphics processing systems.

Unlike in conventional caches, in the technology described herein data entries in the cache for the cached vertex attribute data are indexed in two different ways.

In a first set of cache lines the data entries are grouped together on a per-polygon basis, and tagged with a polygon identifier which identifies the polygon with which the vertices associated with the vertex attribute data corresponding to the data entries are associated, e.g. the polygon to which a given three vertices are common (in the case of a triangular polygon).

In a second set of cache lines the data entries are stored on a per-vertex basis and individually tagged with a vertex identifier which identifies the individual vertex with which the vertex attribute data corresponding to a particular data entry is associated. Thus, for example, for a particular triangular polygon, the vertex attribute data for the three vertices that define the polygon will be stored separately, each having a tag identifying the vertex associated with the vertex attribute data.

Multiple data entries may be written to the same line in the second set of lines, e.g. corresponding to all the vertices for a particular polygon. In an embodiment each data entry in the second set of lines is written into a different line. Therefore, in an embodiment, the method comprises, for the plurality of pieces of vertex attribute data that the line in the first set of lines in the cache relates to, writing, to each of a plurality of lines in a second set of lines of the cache, a data entry associated with a piece of vertex attribute data, the piece of vertex attribute data being associated with one of the vertices of the polygon that the line in the first set of lines in the cache relates to, and a tag comprising a vertex identifier to identify the vertex associated with the data entry.

As will be discussed further below, the Applicants have recognised that by identifying the data entries in the first set of lines of the cache by the polygons to which vertices are common, only a single query for the polygon identifier needs to be performed to return the vertex attribute data for all the vertices in the polygon, compared with the second set of lines in which separate queries have to be performed for each vertex, i.e. searching for each separate vertex identifier.

The data entries tagged with a common polygon identifier are grouped together, i.e. written in the same line of the first set of lines, so only a single tag is needed for each polygon, which comprises the polygon identifier, compared to the second set of lines in which each data entry has a separate tag comprising a different vertex identifier. This allows queries within the cache to be performed more efficiently when the vertex attributes for the vertices for a particular polygon are required, i.e. because only one polygon identifier needs to be searched for as opposed to multiple different vertex identifiers, as well as reducing the size of the cache, i.e. because the tag for one polygon is smaller than the tags for multiple vertices, both owing to the fact that it only comprises a single identifier and that as there are fewer polygons the identifiers can be written to a shorter data word.

In an embodiment, each polygon is a triangle, but could also be a quadrilateral or other simple polygon having multiple vertices which have attribute data associated with them.

The cache could be arranged such that there is no differentiation between the first set of lines and the second set of lines of the cache, other than the way in which the lines are tagged. In this arrangement, when a query for a polygon identifier or vertex identifiers is performed, all the lines of both the first and second set of lines have to be searched, which the Applicants have recognised is not particularly efficient.

Therefore, in an embodiment, the first set of lines and the second set of lines of the cache are distinguishable from each other, such that a query for a polygon identifier only needs to search the first set of lines of the cache and a query for a vertex identifier only needs to search the second lines of the cache. This can be implemented in any desired and suitable way.

In one embodiment the first and second sets of cache lines can be distinct from each other within the cache, e.g. physically separate, and/or the first set of lines and/or the second set of lines could comprise an identifier, e.g. a flag or tag, to identify the first set of lines from the second set of lines. Organising the sets of lines in this way makes the searches more efficient because only the lines with the tags containing the desired identifiers are searched. The first set of lines could be in a different cache level to the second set of lines but, in an embodiment, both the first set of lines and the second set of lines are within the same cache level, e.g. a conventional level one cache.

The data entries can comprise the vertex attribute data itself, i.e. the vertex attribute data is stored directly in the first set of lines and/or in the second set of lines of the cache. Thus, in one embodiment, the vertex attribute data is stored directly in the first set of lines and the second set of lines (though with individual pieces of vertex attribute data not necessarily being duplicated between the first set of lines and the second set of lines of the cache), and the method comprises writing, to a line in the first set of lines, a plurality of pieces of vertex attribute data, the plurality of pieces of vertex attribute data being associated with the vertices of a polygon, and a tag comprising a polygon identifier to identify the polygon; and/or for the plurality of pieces of vertex attribute data, writing, to one or more (and, in an embodiment, each of a plurality of) lines in the second set of lines, a piece of vertex attribute data being associated with one of the vertices of the polygon, and a tag comprising a vertex identifier to identify the vertex.

Alternatively or additionally a data entry can comprise a pointer to the vertex attribute data which is stored in a different location, e.g. a local memory. This enables the size of the cache to be kept small in size as the vertex attribute data is not stored in the cache itself. In an embodiment the data entries in the second set of lines comprise the vertex attribute data itself, and the data entries in the first set of lines comprise pointers which point to the vertex attribute data stored in the second set of lines. This arrangement keeps the size of the first set of lines small, as it only stores pointers which take up little space, and thus makes it more efficient to perform a query in. The actual data is stored in the second set of lines, which can thus be organised in any desired and suitable way.

As generally each polygon will contain multiple vertices, typically three or four (in an embodiment, three), in an embodiment one or more of the data entries in the first set of lines comprises a plurality of pointers, e.g. three pointers, to the vertex attribute data in the second set of lines. (For triangular polygons, generally a line in the first set of lines will contain three pointers, which point to (up to) three different lines in the second set of lines, each line in the second set of lines comprising vertex attribute data associated with the vertex represented by the vertex identifier in the tag.)

Multiple pointers from a line in the first set of lines may point to the same line in the second set of lines but, in an embodiment, the pointers from a line in the first set of lines each point to a different line in the second set of lines. Correspondingly, multiple pointers from a line in the first set of lines may point to the same vertex attribute data in the second set of lines (whether in the same or different lines in the second set of lines) but, in an embodiment, the pointers from a line in the first of lines point to different pieces of vertex attribute data in the second set of lines.

In this embodiment, in which the vertex attribute data is written to the second set of lines and pointers to the vertex attribute data in the second set of lines are written to the first set of lines, in an embodiment a plurality of pointers (associated with the plurality of pieces of vertex attribute data for a polygon) are written to a line in the first set of lines along with a tag comprising a polygon identifier to identify the polygon associated with the plurality of pointers, and, for the corresponding plurality of pieces of vertex attribute data, a piece of vertex attribute data and a tag comprising a vertex identifier to identify the vertex associated with the piece of vertex attribute data is written to the respective line in the second set of lines that the corresponding pointer in the line in the first set of lines points to. In an embodiment, each pointer that points to a line in the second set of lines points directly to the piece of vertex attribute data in the line in the second set of lines (and the line in the second set of lines will be tagged with a vertex identifier associated with the vertex of the polygon identified by the polygon identifier that the pointer relates to).

Thus the pointers which are identified by the same polygon identifier are grouped together, i.e. written to the same line of the first set of lines, so only a single tag is needed for each polygon, which comprises the polygon identifier. Therefore in an embodiment the one or more lines in the first set of lines each store plural, e.g. three, pointers and a tag comprising a polygon identifier to identify the polygon associated with the pointers.

In an embodiment the tags in the first set of lines and second set of lines also comprise an attribute index to identify the attribute variable (e.g. colour, texture, alpha value, etc.) quantified by the vertex attribute data. The tags can also comprise a data format index to identify the data format in which the vertex attribute data is stored.

The vertex attribute data, pointers and associated tags, etc., can be stored in the cache at any desired and suitable time during operation of the graphics processing system.

The technology described herein also extends to the querying of the cached data.

Thus in an embodiment the method comprises, when vertex attribute data is required by the graphics processing system:

submitting a query to the first set of lines of the cache to search for a tag comprising the polygon identifier for the polygon that the vertex attribute data relates to, and, when the tag is present, returning the plurality of data entries associated with the tag, and when the tag in the first set of lines of the cache is not present, submitting a query in the second set of lines of the cache to search for the tags comprising the vertex identifiers for the vertices of the polygon that the vertex attribute data relates to, and, for the tags that are present, returning the data entries associated with the tags. In an embodiment the graphics processing system correspondingly also comprises processing circuitry arranged to perform these method steps.

Thus, another embodiment of the technology described herein comprises a method of performing a query in a cache for a plurality of pieces of vertex attribute data associated with a polygon, the cache being located in a graphics processing system for processing a plurality of polygons, the plurality of polygons comprising a plurality of vertices with which the plurality of pieces of vertex attribute data are associated;

the method comprising, when vertex attribute data relating to a polygon is required by the graphics processing system:

submitting a query to a first set of lines of a cache to search for a tag comprising a polygon identifier for the polygon that the vertex attribute data relates to, and, when the tag is present, returning the data entries associated with the tag, and when the tag in the first set of lines of the cache is not present, submitting a query in a second set of lines of the cache to search for the tags comprising the vertex identifiers for the vertices of the polygon, and, for the tags that are present, returning the data entries associated with the tags.

Another embodiment of the technology described herein comprises a graphics processing system for processing a plurality of polygons comprising a cache for storing a plurality of pieces of vertex attribute data associated with a polygon, the plurality of polygons comprising a plurality of vertices with which the plurality of pieces of vertex attribute data are associated, wherein the cache comprises a plurality of lines each for the storage of data entries, and each having a tag for identifying the vertex attribute data stored in the cache line;

wherein one or more lines in a first set of lines of the cache are arranged to store a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries; and a plurality of lines in a second set of lines of the cache are each arranged to store a data entry associated with a piece of vertex attribute data, the piece of vertex attribute data being associated with one of the vertices of a polygon, and a tag comprising a vertex identifier to identify the vertex associated with the data entry;

wherein the graphics processing system comprises processing circuitry arranged, when vertex attribute data relating to a polygon is required by the graphics processing system, to:

submit a query to the first set of lines of the cache to search for a tag comprising the polygon identifier for the polygon that the vertex attribute data relates to, and, when the tag is present, return the data entries associated with the tag, and when the tag in the first set of lines the cache is not present, submit a query in the second set of lines of the cache to search for the tags comprising the vertex identifiers for the vertices of the polygon, and, for the tags that are present, return the data entries associated with the tags.

In these embodiments of the technology described herein, the first set of lines is queried first, by polygon identifier, for the vertex attribute data associated with the vertices of the polygon.

When a query to the first set of lines of the cache, i.e. by polygon identifier, is successful, i.e. a line in the first set of lines of the cache contains the polygon identifier being searched for (a cache "hit"), the vertex attribute data associated with the polygon is returned, either by reading the pieces of vertex attribute data from the first set of lines, in the embodiment in which the vertex attribute data is stored in the first set of lines, or following the pointers from the first set of lines to the lines in the second set of lines which contain the vertex attribute data, in the embodiment in which the vertex attribute data is only stored in the second set of lines.

When a query to the first set of lines of the cache is unsuccessful, i.e. the polygon identifier being searched for is not present in the one or more lines of the first set of lines of the cache (there is a cache "miss"), the second set of lines of the cache is queried for the vertex identifiers associated with the vertices of the polygon.

In an embodiment the graphics processing system comprises a look-up table, e.g. stored in a cache, which comprises information relating the vertex identifiers to the polygon identifiers, i.e. a query to the look-up table for a polygon identifier returns the vertex identifiers associated with that polygon, thus conveniently providing the required vertex identifiers to perform the query of the second set of lines of the cache.

The Applicants have recognised in this regard, that owing to vertices being shared between adjacent polygons, one or more of the data entries for the vertices corresponding the polygon identifier being queried may be present within the second set of lines but, for example, be tagged in the first set of lines as corresponding to a different polygon such that they are not found by the query in the first set of lines. Therefore it is possible for a cache "miss" in the first set of lines to be followed by a cache "hit" in the second set of lines (for one or more of the vertex attributes being searched for still to be present in the plurality of lines of the second set of lines of the cache, notwithstanding the "miss" in the first set of lines of the cache). The desired vertex attribute data can then still be returned from the second set of lines.

In an embodiment, when not all the vertex attribute data for the vertices associated with the vertex identifiers are present in the second set of lines, i.e. resulting in a cache "miss" for this data, the "missing" pieces of vertex attribute data are fetched into the cache. The vertex attribute data can be stored in, and thus fetched from, any desired and suitable location within, or external to, the graphics processing system. In an embodiment the vertex attribute data is stored in, and fetched from, a main memory of the graphics processing system.

The fetched vertex attribute data could be written to a line in the first set of lines along with a tag comprising a polygon identifier, i.e. the polygon identifier for which the initial query was made in the first set of lines. However, in an embodiment, the fetched pieces of vertex attribute data are written to one or more lines in the second set of lines along with a tag comprising a vertex identifier for each piece of vertex attribute data, e.g. a separate line for each piece of vertex attribute data.

Performing a query of the second set of lines of the cache follows a cache miss in the first set of lines, i.e. the first set of lines does not contain any data entries with associated tags comprising the queried polygon identifier. In an embodiment this situation is remedied, e.g. following successful queries in the second set of lines and/or fetching the required vertex attribute data, by writing the necessary data entries into the first set of lines so that they are available when a subsequent query for the polygon identifier is made. Therefore in one embodiment, when the tag in the first set of lines is not present (comprising the polygon identifier which was initially queried), data entries associated with the vertex attribute data corresponding to the vertices in the polygon are written to a line in the first set of lines, along with a tag comprising the polygon identifier to identify the data entries, e.g. once the vertex attribute data in question is complete in the second set of lines of the cache.

As explained above, the data entries could comprise the vertex attribute data itself, and so the vertex attribute data could simply be copied to a line in the first set of lines from a plurality of lines in the second set of lines and tagged with the polygon identifier, e.g. following a cache hit in the second set of lines or the vertex attribute data being fetched into the second set of lines. However in an embodiment, as also explained above, the data entries in the first set of lines comprise a pointer to the vertex attribute data which is stored in the second set of lines. Therefore in an embodiment, following a cache miss in the first set of lines for the plurality of pieces of vertex attribute data associated with a polygon, a set of pointers is written to a line in the first set of lines to point to the vertex attribute data in the second set of lines associated with the polygon, along with a tag comprising the polygon identifier to identify the pointers. These pointers will point to the vertex attribute data for the vertices of the polygon, which are either already present in the second set of lines and/or are fetched into the second set of lines. As will be described below, in some embodiments it is possible to create these pointers even before the vertex attribute data arrives into the second set of lines of the cache.

In an embodiment, following a cache miss for vertex attribute data corresponding to a polygon in the first set of lines or one or more vertices in the second set of lines, and before the data entries associated with the vertex attribute data are written to the cache lines, one or more cache lines are allocated for the data entries in the first set of lines, e.g. one cache line is allocated for the data entries corresponding to the polygon in the first set of lines, and one or more cache lines are allocated for the data entries corresponding to the vertices in the second set of lines (depending on how many cache misses there were for the vertices in the second set of lines). The allocation of lines in the first set of lines and/or the second set of lines will be made according to whether the cache miss was in the first set of lines and/or the second set of lines.

It will be appreciated that once all the cache lines in the first set of lines and/or the second set of lines have been filled (as the cache is designed as a temporary store, it will be limited in size, and thus have a finite number of lines into which data entries can be written), e.g. following queries for the vertex attribute data, there will be no available space for newly requested data entries, which are not currently present in the cache, to be written to the cache. Thus, in an embodiment, following a cache miss for a plurality of pieces of vertex attribute data corresponding to a polygon in the first set of lines or one or more vertices in the second set of lines, the cache is searched for available lines which, when present, are allocated for the data entries associated with the vertex attribute data; when there are no available lines, one or more lines of the cache are "evicted" from the cache and the freed cache lines are then allocated for the data entries associated with the vertex attribute data.

For example, a cache line can be evicted from the first set of lines and then allocated for the data entries corresponding to the polygon being queried, and one or more cache lines can be evicted from the second set of lines and then allocated for the data entries corresponding to the vertices being queried (depending on how many cache misses there were for the vertices in the second set of lines). As above, the eviction and allocation of lines in the first set of lines and/or the second set of lines will be made according to whether the cache miss was in the first set of lines and/or the second set of lines.

The cache lines chosen to be evicted can be chosen in any desired and suitable manner. For example, a least recently used algorithm could be used to determine which line in the cache had its information accessed the longest time ago and, once identified, this line could be evicted so that the line can be allocated to newly requested data entries. However this algorithm requires information relating to when a line was accessed to be stored, which can be expensive, both in terms of data storage and efficiency in assessing which cache line to evict. Alternatively the cache line to evict could be chosen at random; this requires no information regarding a line's access history to be stored, but could result in frequently used vertex attribute data being overwritten.

In an embodiment the use of the cache lines is tracked, and the cache line eviction is based on the tracking of the cache lines. In an embodiment a record is monitored of which cache lines contain data that is being used or to be used in the future.

In such an embodiment, each cache line has an indicator associated with it, e.g. an indicator for each line, which is used to track the usage of the vertex attribute data that the line relates to. In an embodiment the indicator comprises a reference counter, e.g. which is incremented when the cache line is queried and is decremented when the vertex attribute data has been read out. Using indicators, e.g. reference counters, in this way identifies which cache lines are in use at any one time, i.e. that have their indicators set (e.g. whose reference counters are non-zero), and should therefore be locked to prevent any change to these lines, for little expense, and thus allows an inactive cache line, i.e. that does not have its indicator set (e.g. whose reference counter is equal to zero), to be evicted and be allocated to vertex attribute data for a new request. The inactive cache line to be evicted can be chosen in any desired and suitable way, e.g. using a (pseudo-) random search, or a sequential search through the list of cache lines, or by keeping track of and identifying the least recently used inactive cache line, though this latter option is more complex.

Thus, in an embodiment, following a cache miss for a plurality of pieces of vertex attribute data corresponding to a polygon in the first set of lines or a cache miss for one or more pieces of vertex attribute data corresponding to one or more vertices in the second set of lines, the cache is searched for available lines, which when present are allocated for the data entries associated with the vertex attribute data; when there are no available lines, the cache line usage trackers (e.g. reference counters) are used to identify the inactive lines in the cache (e.g. with the reference counters equal to zero), and one or more inactive lines of the cache, i.e. inter alia the data entries and tags, are "evicted" from the cache and the inactive cache lines are allocated for the data entries associated with the (new) vertex attribute data.

When there are no inactive lines present in the cache this will lead to a "hard miss" response to the cache query, i.e. the query does not return the requested vertex attribute data.

In some embodiments, the indicators for the second set of lines of the cache which are tagged by the vertex identifiers do not need to be changed unless there is a cache miss in the first set of lines of the cache. This is because the second set of lines of the cache are not queried unless there is a cache miss in the first set of lines of the cache. Thus, in an embodiment, the indicators in the lines of the second set of lines of the cache are only modified following an unsuccessful query for a polygon identifier, i.e. in the first set of lines.

When pointers are used from lines in the first set of lines to lines in the second set of lines, in an embodiment, when pointers are created to point to the vertex attribute data in the second set of lines, the usage indicators for the lines in the second set of lines containing these vertex attribute data are set, e.g. a reference counter for a particular line of the second set of lines is incremented each time a pointer is created to point to the vertex attribute data therein. Thus the usage trackers (reference counters) for the lines of the second set of lines are a count of how many lines in the first set of lines point thereto. (As discussed above, because a vertex can be common to multiple polygons, it is possible for vertex attribute data in the second set of lines tagged by a particular vertex identifier to be pointed to by multiple different pointers in the first set of lines which are each tagged by different polygon identifiers.)

Therefore, in an embodiment, the, e.g. reference counters, for the lines of the second set of lines are decremented when a pointer to the vertex attribute data of the line is removed, i.e. the corresponding line of the first set of lines is evicted. When the reference count of a line in the second set of lines is zero, this indicates that it does not have any pointers from lines in the first set of lines to the vertex attribute data, i.e. the line is inactive. (This may not necessarily require the eviction of these lines in the second set of lines, e.g. when these lines are not required to store new vertex attribute data being fetched into the cache.)

In the embodiments in which pointers are used from lines in the first set of lines to point to lines in the second set of lines, the lines in the second set of lines could be allocated to the lines in the first set of lines in any desired and suitable way. In an embodiment the lines in the second set of lines are fully associative to the lines in the first set of lines, i.e. there are no restrictions on which lines in the second set of lines can be used for particular lines in the first set of lines.

As discussed above, the lines of cache in the first set of lines and the second set of lines could be arranged in any desired and suitable way, including how many lines are provided in each set of lines. Owing to the second set of lines being arranged to store data entries tagged by vertices and the first set of lines being arranged to store data entries tagged by polygons, in an embodiment the second set of lines contains a greater number of lines than the first set of lines.

In an embodiment, in order that there are always enough cache lines in the second set of lines to store all the vertex attribute data associated with the polygons for which data is stored in the first set of lines, the ratio of the number of cache lines in the second set of lines to the number of lines in the first set of lines is greater than or equal to the ratio of the number of vertices to the number of polygons, e.g. greater than or equal to the number of vertices in each polygon. Thus for triangular polygons, for example, in an embodiment the ratio of the number of cache lines in the second set of lines to the number of lines in the first set of lines is greater than or equal to three (i.e. there are at least three times as many cache lines in the second set of lines compared to the first set of lines).

This condition, for the ratio of the number of lines in the second set of lines to the number of lines in the first set of lines, ensures that a "hard miss" will not occur in the second set of lines, i.e. there will always be available lines (empty or inactive, i.e. not containing vertex attribute data currently being used) to be allocated to vertex attribute data which is fetched into the cache, even if this requires the eviction of information from lines which are not currently being used, e.g. they contain vertex attribute data corresponding (only) to a polygon for which a line has been evicted in the first set of lines.

A consequence of this property is that, following a miss in the first set of lines for a given polygon, and thus the allocation of a line in the first set of lines for the pointers to the vertex attribute data associated with the polygon (assuming that a line in the first set of lines can be allocated, i.e. a hard miss is not encountered), the query for the vertex attribute data associated with the polygon will always return a result, i.e. either some or all of the vertex attribute data will already be present in the second set of lines and there will be lines able to be allocated for any remaining vertex attribute data which needs to be fetched into the cache (even if none of the vertex attribute data for the polygon is already present in the second set of lines). This means that pointers from the line in the first set of lines for the polygon can be created to point to the lines in the second set of lines allocated for the vertex attribute data for the vertices of the polygon, even before the vertex attribute data has been fetched into the lines of the second set of lines.

Thus in an embodiment, following a cache miss for vertex attribute data corresponding to a polygon in the first set of lines, the first set of lines of the cache is searched for available lines, which, when present, are allocated for the data entries associated with the vertex attribute data; when there are no available lines, the, e.g. reference counters, are used to identify the inactive lines in the first set of lines of the cache, and an inactive line of the cache is "evicted" from the cache and the inactive cache line is allocated for the pointers, and the pointers and a tag associated with the vertex attribute data for the polygon are written to the line. When a cache line in the first set of lines is evicted, on allocation of the line for a new set of vertex attribute data, the reference counter for the line is incremented.

On eviction of the information from a cache line in the first set of lines, the reference counters of the lines in the second set of lines to which the pointers from the evicted line pointed are decremented, i.e. because there is now one fewer pointer to these lines. A query is then submitted to the second set of lines to look for the tags comprising the vertex identifiers for the vertices in the polygon related to the vertex attribute data being queried, and, for the tags that are present, the reference counters for these lines in the second set of lines are incremented and pointers to the vertex attribute data in these lines are written to the allocated line in the first set of lines so that the vertex attribute data for the vertices can be returned.

For the tags that are not present, the second set of lines of the cache is searched for available lines which, when present, are allocated for the associated vertex attribute data; when there are no available lines, the, e.g. reference counters, are used to identify the inactive lines in the second set of lines of the cache, and the required number of inactive lines of the cache, e.g. one, two or three lines are "evicted" from the cache and the inactive cache lines are allocated for the vertex attribute data and the tags associated with the vertices of the polygon are written to the allocated lines. When one or more cache lines in the second set of lines are evicted, on allocation of the lines for new vertex attribute data the reference counters for the lines are incremented and pointers to the vertex attribute data in these lines are written to the line in the first set of lines.

Finally, the required vertex attribute data is fetched into the cache lines allocated in the second set of lines so that the vertex attribute data can be returned to complete the query.

The main memory can comprise any memory of the data processing system that is suitable for this purpose. The cache can comprise any suitable cache of or accessible to the graphics processing system.

The technology described herein can be used for all forms of output that a graphics processing system may be used to generate, such as frames for display, render-to-texture outputs, etc. In an embodiment the output, e.g. fragment shaded, data values from the graphics processing are exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus, in an embodiment, the graphics processing system is a tile-based system.

The graphics processor and system can otherwise include, and in an embodiment does include, any one or more, and in an embodiment all, of the other processing stages that graphics processors and systems normally include. Thus, for example, in an embodiment it also includes a rasteriser and a renderer. In an embodiment the renderer is in the form of, or includes, a programmable fragment shader.

The graphics processor and system may also contain any other suitable and desired processing stages that a graphics processing pipeline may contain such as a depth (or depth and stencil) tester, a blender, etc.

In an embodiment, the graphics processing system comprises, and/or is in communication with, one or more memories and/or memory devices that store the data described herein, and/or that store software for performing the processes described herein. The graphics processing system may also be in communication with the host microprocessor, and/or with a display for displaying images based on the output of the graphics processing system.

In an embodiment, the various functions of the technology described herein are carried out on a single graphics processing platform that generates and outputs the rendered fragment data that is, e.g., written to the frame buffer for the display device.

Although the technology described herein has been described hereto in the context of a graphics processing system, the Applicants have appreciated that it can be used in other types of data processing systems in the situation where a set of plural data items can be identified in two different ways, e.g. individually and collectively. For example, a cache containing data entries referred to by virtual or physical memory addresses could be organised in this way.

Thus another embodiment of the technology described herein comprises a method of storing pieces of data in a data processing system comprising:

writing, to a line in a first set of lines of a cache, one or more data entries associated with one or more pieces of data, and a tag comprising a first identifier to identify the one or more data entries; and/or for the one or more pieces of data that the line in the first set of lines in the cache relates to, writing, to a line in a second set of lines of the cache, a data entry associated with a piece of data, and a tag comprising a second identifier to identify the data entry.

Another embodiment of the technology described herein comprises a data processing system comprising:

a cache comprising a plurality of cache lines each for the storage of data entries, and each having a tag for identifying the data stored in the cache line; and processing circuitry arranged to:

write, to a line in a first set of lines of the cache, one or more data entries associated with one or more pieces of data, and a tag comprising a first identifier to identify the one or more data entries, and to:

write, to a line in a second set of lines of the cache, a data entry associated with a piece of data, and a tag comprising a second identifier to identify the data entry.

Another embodiment of the technology described herein comprises a method of performing a query in a cache comprising:

submitting a query to a first set of lines of a cache to search for a tag comprising a first identifier associated with one or more data entries, the one or more data entries being associated with one or more pieces of data, and, when the tag is present, returning the data entries associated with the tag, and when the tag in the first set of lines of the cache is not present, submitting a query in a second set of lines of the cache to search for a tag or tags comprising a second identifier associated with the one or more data entries, and, for the tags that are present, returning the data entries associated with the tags.

Another embodiment of the technology described herein comprises a data processing system comprising a cache for storing a plurality of pieces of data, wherein the cache comprises a plurality of lines each for the storage of data entries, and each having a tag for identifying a data entry stored in a cache line;

wherein one or more lines in a first set of lines of the cache are arranged to store one or more data entries associated with one or more pieces of data, and a tag comprising a first identifier to identify the one or more pieces of data that are associated with the one or more data entries; and one or more lines in a second set of lines of the cache are arranged to store one or more data entries associated with one or more pieces of data, and a tag comprising a second identifier to identify the one or more pieces of data that are associated with the one or more data entries;

wherein the data processing system comprises processing circuitry arranged, when one or more pieces of data are required by the data processing system, to:

submit a query to the first set of lines of the cache to search for a tag comprising a first identifier associated with the one or more pieces of data, and, when the tag is present, return the data entries associated with the tag, and when the tag in the first set of lines the cache is not present, submit a query in the second set of lines of the cache to search for a tag or tags comprising a second identifier associated with the one or more pieces of data, and, for the tags that are present, return the data entries associated with the tags.

As will be appreciated by those skilled in the art, these embodiments of the technology described herein can, and in an embodiment do, include any one or more or all of the optional features of the technology described herein. Thus, for example, in an embodiment the data entries in the first set of cache lines comprise pointers to data entries in the second set of cache lines.

In one embodiment, the first identifier is an identifier that identifies a plurality of data entries in the first set of lines of the cache collectively, i.e. the method comprises the step of writing, to a line in the first set of lines of the cache, a plurality of data entries associated with a plurality of pieces of data, and a tag comprising a first identifier that identifies the plurality of data entries (pieces of data) collectively.

Correspondingly, in an embodiment, the second identifier is an identifier that identifies the data entries in the second set of lines of the cache individually, i.e. the method comprises the step of, for the plurality of pieces of data that the line in the first set of lines in the cache relates to, writing, to a line in the second set of lines of the cache, a data entry associated with a piece of data, and a tag comprising a second identifier that identifies the data entry (pieces of data) individually.

As discussed above, such a cache may be implemented in a virtual memory system, in which multiple processes may be running at the same time. In this case, each process can be assigned its own virtual address space, with a mapping from the virtual address space to a physical address space. In an embodiment the cache is then arranged to store virtual memory addresses in the first set of lines and the physical addresses in the second set of lines.

Thus, in another embodiment, the first identifier is an identifier that identifies a data entry in the first set of lines of the cache by reference to a virtual memory address, i.e. the method comprises the step of writing, to a line in a first set of lines of the cache, a data entry associated with the piece of data, and a tag comprising a virtual memory address that identifies the data entry (piece of data).

Correspondingly, in an embodiment, the second identifier is an identifier that identifies the data entries in the second set of lines of the cache by reference to a physical memory address, i.e. the method comprises the step of, for the piece of data that the line in the first set of lines in the cache relates to, writing, a line in the second set of lines of the cache, a data entry associated with a piece of data, and a tag comprising a physical memory address that identifies the data entry (pieces of data).

In an embodiment, when a process wishes to retrieve data from memory it first submits a query for the virtual memory address to the first set of lines. When this query fails to find a line containing the virtual memory address in the first set of lines of the cache then, in an embodiment, a query is submitted to the second set of lines of the cache for the physical memory address, in an embodiment using a lookup to translate the virtual memory address to a physical memory address.

Such a cache for a virtual memory system is advantageous because, as with data entries stored for both polygons and vertices, different relationships between virtual and physical addresses may exist, e.g. it may not be as simple as a one to one mapping. For example, the same physical address, e.g. a physical page containing a shared library, could be mapped into two or more different virtual address spaces, possibly at different virtual addresses. In this situation two or more virtual addresses in the first set of cache lines will be associated with one physical address in the second set of cache lines, e.g. linked by pointers. in an embodiment each entry in the first set of lines corresponds to a single entry in the second set of lines, and multiple entries in the first set of lines may correspond to a single entry in the second set of lines.

The technology described herein can be implemented in any suitable system, such as a suitably configured microprocessor based system. In an embodiment, the technology described herein is implemented in a computer and/or micro-processor based system.

The data processing system may also comprise, and in an embodiment does also comprise, and/or is in communication with, one or more memories and/or memory devices that store the data described herein, and/or that store software for performing the processes described herein. The data processing system may also be in communication with a host microprocessor, and/or with a display for displaying images based on the data described above, and/or with a graphics processor for processing the data described above.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or microprocessor system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus a further embodiment of the technology described herein comprises computer software and such software installed on a computer software carrier for carrying out at least one of the steps of the methods set out herein.

The technology described herein may be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, including but not limited to, semiconductor, magnetic, or optical, or transmitted using any communications technology, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 1:
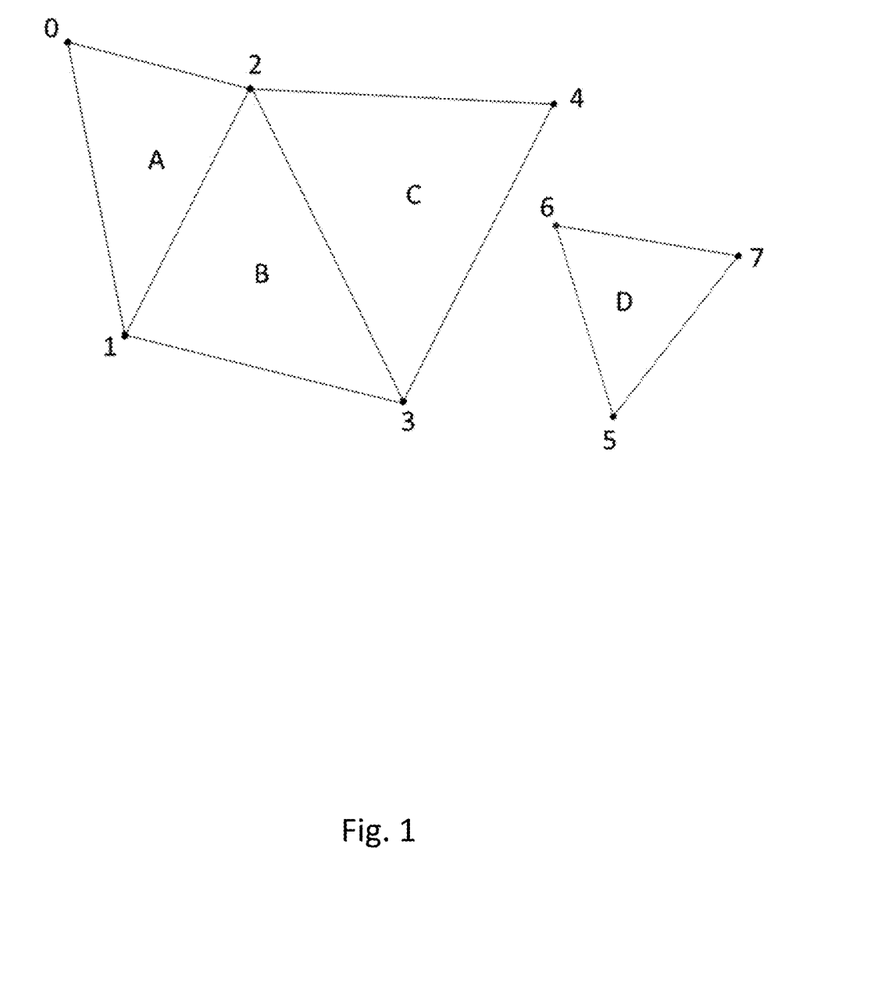
FIG. 1 shows a set of polygons and vertices as are typically processed by a graphics processing system in accordance with the technology described herein.

FIG. 1 shows an illustrative set of triangles A, B, C, D to be used in a graphics processing system in accordance with an embodiment of the technology described herein. The triangles A, B, C, D are generated by an applications program interface for the graphics processing system, along with other similar basic components (so-called "primitives", usually in the form of simple polygons such as triangles and quadrilaterals), using the graphics drawing instructions (requests) received from the application (e.g. game) that requires the graphics output.

Each of the triangles A, B, C, D is defined by and represented as a set of vertices 0, 1, 2, 3, 4, 5, 6, 7. Each vertex for the triangles A, B, C, D has associated with it a set of vertex attribute data (such as position, colour, texture coordinates and other such attributes) representing the primitive at the vertex. This attributes data is then used, for example, when rasterising and rendering the primitives to generate the desired output of the graphics processing system.

Each triangle A, B, C, D and each vertex 0, 1, 2, 3, 4, 5, 6, 7 is labelled with an identifier, i.e. polygon identifiers A, B, C and D, and vertex identifiers 0, 1, 2, 3, 4, 5, 6 and 7 respectively. These identifiers are used, as will be described below, to identify the triangles and vertices in relation to the vertex attribute data that is stored in a cache of the graphics processing system.

It can be seen from FIG. 1 that a variety of different arrangements of the triangles A, B, C, D and vertices 0, 1, 2, 3, 4, 5, 6, 7 is possible. For example, the triangle labelled with polygon identifier D is isolated from the other triangles such that its vertices 5, 6, 7 are unique to that triangle. In contrast, the triangles labelled with polygon identifiers A, B and C are adjacent, i.e. sharing an edge, such that some of their vertices, i.e. the ones labelled with vertex identifiers 1, 2, 3, are common to two or more triangles.

Once triangles A, B, C, D and their vertices 0, 1, 2, 3, 4, 5, 6, 7 have been generated and defined, they can be processed by the graphics processing system, in order, for example, to display the frame.

This process basically involves determining which sampling points of an array of sampling points covering the output area to be processed are covered by a primitive, e.g. one of the triangles A, B, C, D, and then determining the appearance each sampling point should have (e.g. in terms of its colour, etc.) to represent the primitive at that sampling point.

These processes, as well as other processes in the graphics processing system, use the vertex attribute data associated with the vertices 0, 1, 2, 3, 4, 5, 6, 7, for example, to determine an attribute (e.g. colour) value for each sampling point covered by a primitive. Commonly the attribute values are determined for a given sampling point by performing linear interpolation of the attribute values for the vertices associated with the primitive that the sampling point represents.

To avoid a request being made to main memory each time vertex attribute data is required, recently used attribute data for vertices is held locally in a cache. Typically, a copy of the most recently used data stored in main memory will be stored in the cache, locally to where it is required, so that when a subsequent request is made for the data, it can be accessed quickly and efficiently, e.g. consuming little power.

Figure 2:
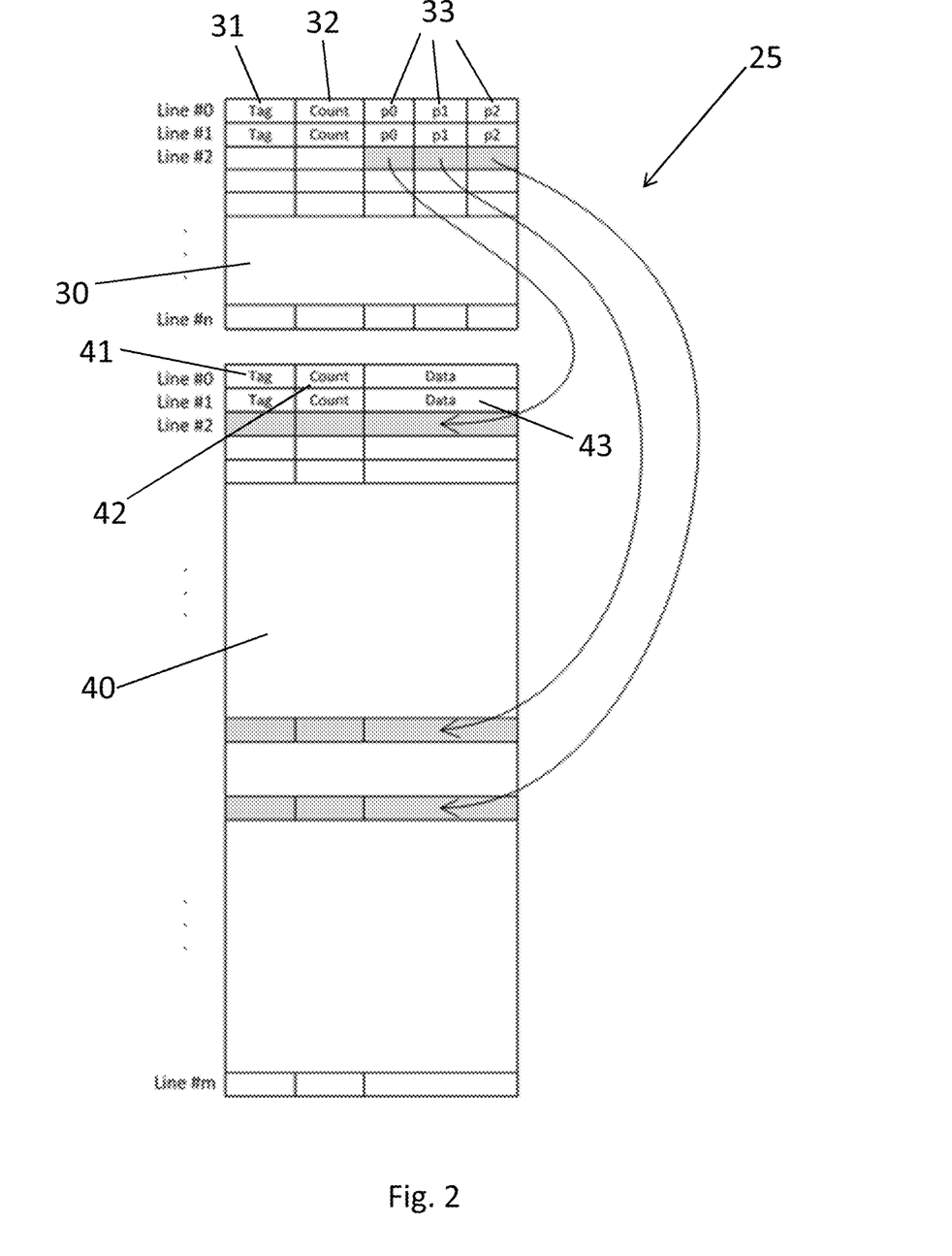
FIG. 2 shows a cache for use in a graphics processing system in accordance with the technology described herein.

A cache 25 for use in a graphics processing system in accordance with an embodiment of the technology described herein is shown in FIG. 2. The cache 25 comprises a first set of lines 30 and a second set of lines 40 arranged in distinct parts of the cache from each other. The second set of lines 40 is used to store vertex attribute data and the first set of lines 30 is used to store pointers to the vertex attribute data in the second set of lines 40. The pointers in the first set of lines 30 are grouped by the triangle for the set of vertices to which the vertex attribute data corresponds.

In the first set of lines 30 of the cache 25, a tag 31, a reference counter 32 and a set of three pointers 33 are written into each line. Each tag 31 comprises a polygon identifier to identify the triangle for that line, i.e. the triangle with which the vertices having the vertex attribute data linked by the pointers in that line are associated, and an attribute index to identify the attribute variable (e.g. colour, texture, alpha value, etc.) quantified by the vertex attribute data. The reference counter 32 indicates whether or not the cache line is in use at any one time, as will be explained in more detail. The three pointers 33 each point to a piece of vertex attribute data in the second set of lines 40 which is associated with one of the vertices in the triangle identified by the polygon identifier.

In the second set of lines 40 of the cache 25, a tag 41, a reference counter 42 and a piece of vertex attribute data 43 are written into each line. Each tag 41 comprises a vertex identifier to identify the vertex for that line, i.e. the vertex with which the piece of vertex attribute data in that line is associated, and an attribute index, i.e. as in the first set of lines 30 of the cache 25. As with the first set of lines 30, the reference counter 32 indicates whether or not the cache line is in use at any one time. The piece of vertex attribute data is pointed at by one or more pointers 33 from the first set of lines 30 (this is possible because, as explained above, a vertex may be common to more than one triangle).

The lines in the second set of lines 40 are fully associative to the lines in the first set of lines 30, i.e. there are no restrictions on which lines in the second set of lines 40 can be used for particular lines in the first set of lines 30. Although not explicitly shown, there are at least three times as many cache lines in the second set of lines 40 as in the first set of lines 30. There are n+1 lines in the first set of lines 30 and m+1 lines in the second set of lines 40. Therefore $m+1 \geq 3*(n+1)$.

Figure 3:
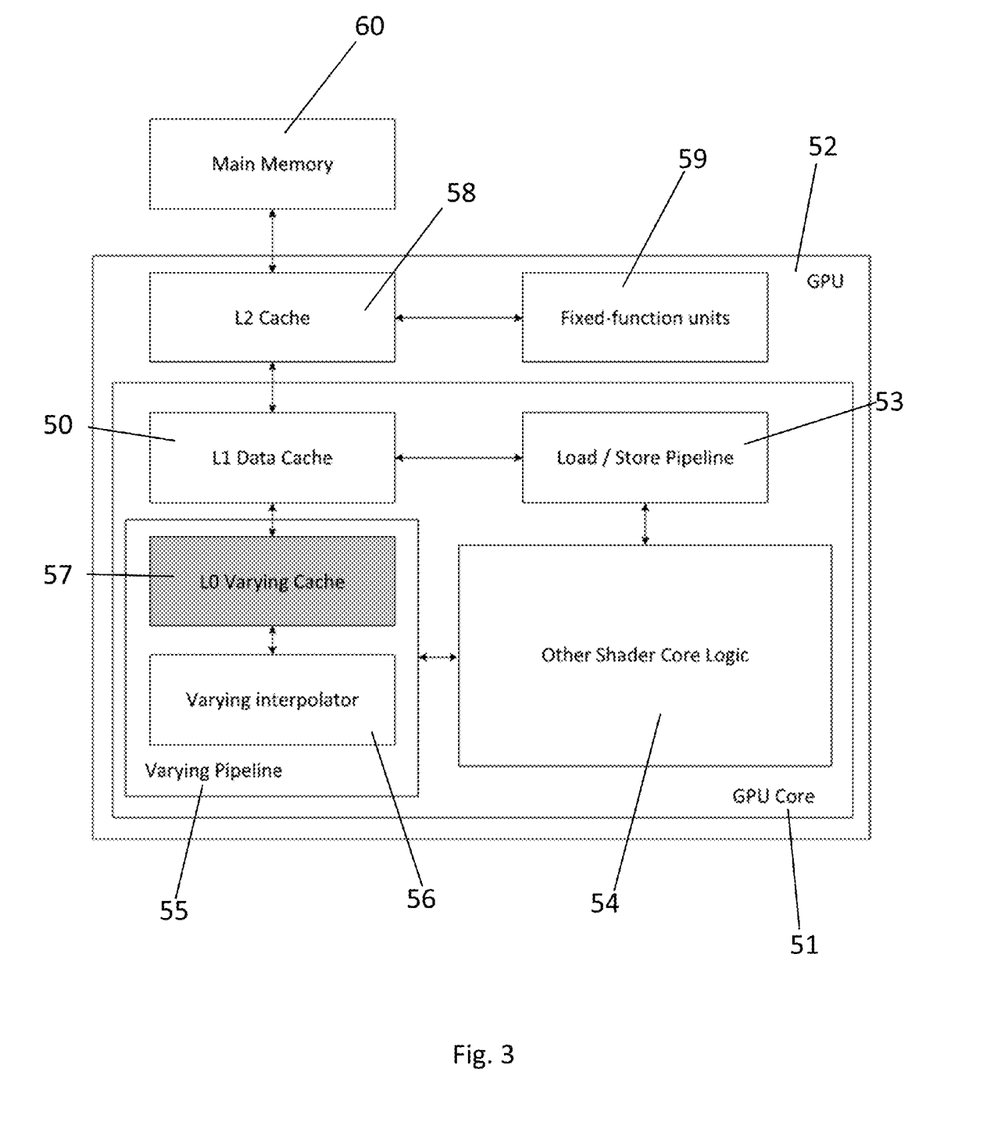
FIG. 3 shows a graphics processing unit (GPU) and main memory for use in a graphics processing system in accordance with the technology described herein.

FIG. 3 shows how, in accordance with an embodiment of the technology described herein, the cache 25 is arranged in a graphics processing system. The cache 25, e.g. as shown in FIG. 2, is located in the Level 1 data cache 50, which itself is provided within the GPU core 51 of a GPU 52 in the graphics processing system.

The Level 1 cache 50 is in data communication with a load/store pipeline 53, which via some other shader core logic 54 is able to exchange data with a varying pipeline 55, all of which are also provided within the GPU core 51. The varying pipeline 55 comprises a varying interpolator 56 (used to performing linear interpolation of the vertex attribute data to return an attribute value for a sampling point) which is in data communication with a Level 0 varying cache 57. The Level 0 varying cache 57, which itself is in data communication with the Level 1 data cache 50, is a small sized cache which stores data, e.g. vertex attribute data, that is being used by the varying interpolator 56.

The Level 1 cache 50 is also in data communication with a Level 2 cache 58 which is provided on the GPU 52, outside of the GPU core 51. The Level 2 cache 58 is also in data communication with a number of fixed-function units 59 (e.g. a tiling unit, and/or a shared control and load balancing unit), and the main memory 60 of the graphics processing system, which is located outside of the GPU 52 and which stores all the vertex attribute data.

Operation of the graphics processing system shown in FIGS. 1 to 3 will now be described with reference to the flow chart shown in FIG. 4.

During the processing of primitives, e.g. triangles, in the graphics processing system, as described above, when an attribute value at a sampling point is required during the rasterisation and/or rendering process by the varying interpolator 56, a request is made for the attribute data at each vertex of the triangle which covers the sampling point. Following the request for the vertex attribute data, a query is made to the cache 25, located in the Level 1 cache 50 within the GPU core 51 (step 101, FIG. 4) (assuming that the required data is not present in the small Level 0 varying cache 57).

Figure 4:
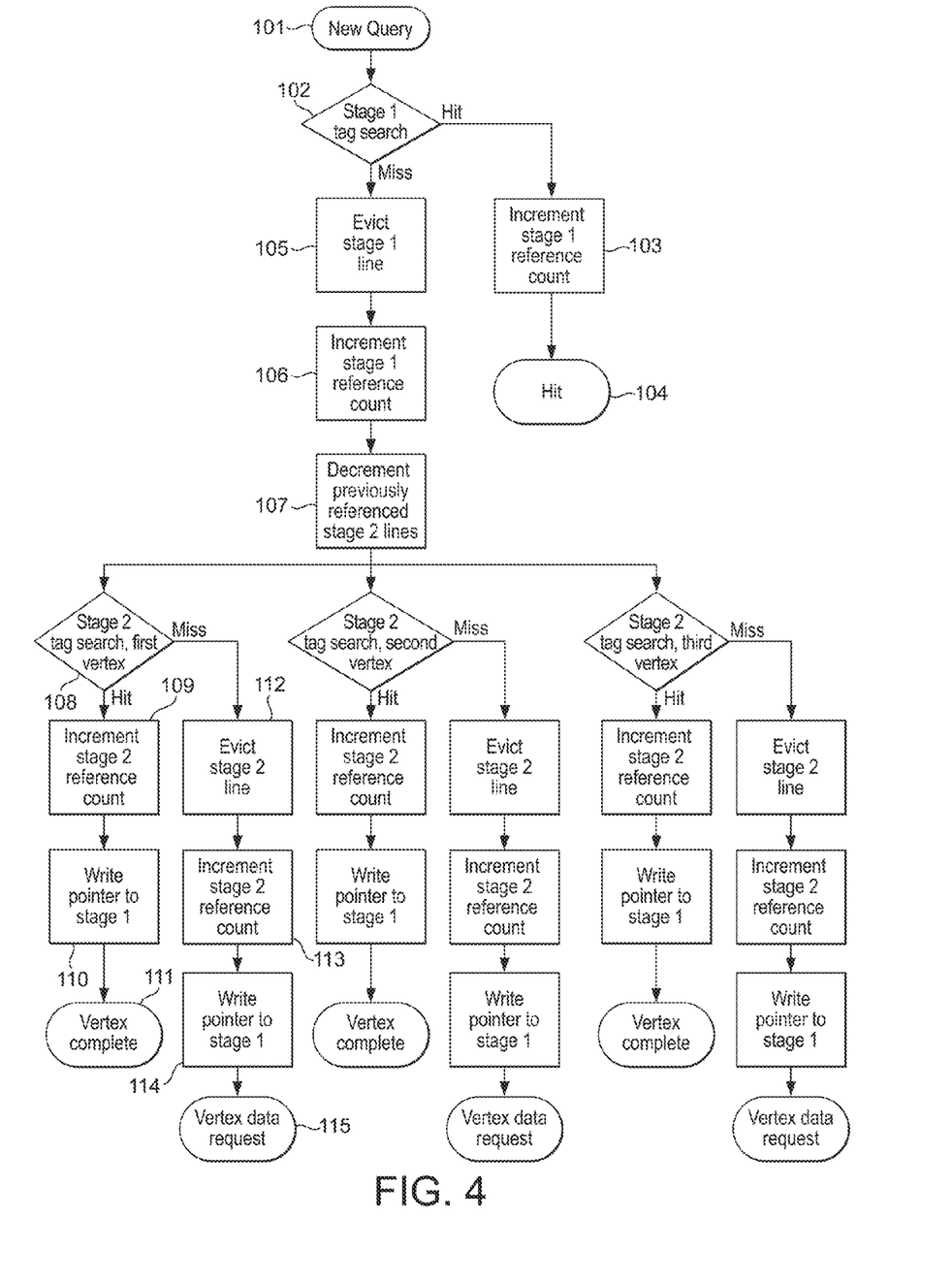
FIG. 4 shows a flow chart detailing the steps of a method in accordance with the technology described herein.

In the cache 25, in response to the query, first a search is performed in the first set of lines 30 of the cache 25, for the tag 31 containing the polygon identifier which identifies the triangle for which the vertex attribute data has been requested (step 102, FIG. 4). When the tag 31 is present in the first set of lines 30 of the cache 25 (a cache "hit"), the reference counter 32 in that line of the cache 25 is incremented to indicate that the cache line is in use (step 103, FIG. 4). Each of the three pointers 33 in that line of the cache 25 is followed to return the vertex attribute data 43, for each of the three vertices of the triangle, stored in the second set of lines 40 of the cache 25 (step 104, FIG. 4).

When the tag 31 containing the polygon identifier for the triangle is not present in the first set of lines 30 of the cache 25 (a cache "miss"), the second set of lines 40 is searched for each of the three vertices of the triangle individually, as will now be described. First, however, it is necessary to create an entry in a line in the first set of lines 30 for the triangle corresponding to the queried vertex attribute data, such that when a subsequent query for the vertex attribute data for the same triangle is made, it can be returned quickly from the first set of lines 30 of the cache 25.

This is done by "evicting" a line in the first set of lines 30 of the cache 25, so that the cache line is available for the storage of new information (step 105, FIG. 4). The line to be evicted is chosen by performing a sequential search down the list of lines in the first set of lines 30, until an inactive line, identified by the reference counters 32 in its tag 31 being zero, (i.e. the vertex attribute data 43 for the line is not currently in use), is found. The inactive line can then be used for the storage of new information. Early on in a processing pass a search could be performed for invalid lines, i.e. ones to which no data has been written, before inactive lines are searched for, but quickly all the lines will contain valid data.

Owing to the fully associative nature of the second set of lines 40 to the first set of lines 30 and the ratio of the number of lines in the second set of lines 40 to the number of lines in the first set of lines 30 which ensures that there will always be enough lines in the second set of lines 40 to store all the vertex attribute data 43 associated with the polygons tagged in the first set of lines 30, the query will return an answer, i.e. it will not result in a "hard miss". (I.e. for the cache 25 shown in FIG. 2, there are at least three times the number of lines (m+1) in the second set of cache lines 40 as there are number of lines (n+1) in the first set of lines 40, so for a triangle tagged in the first set of lines 30, there will always be available the three lines required in the second set of lines 40 to store the three pieces of vertex attribute data 43 for each of its vertices.)

Therefore, at this stage, the reference counter 32 in the tag 31 for the allocated line in the first set of lines 30 is incremented to indicate that the line is currently in use (step 106, FIG. 4), and the new tag 31 (containing the polygon identifier for the triangle for which the query has been submitted and the attribute index for the queried vertex attribute data) is written into the now available line in the first set of lines. (Although the line has been allocated once the tag has been written therein, it is not yet usable until the pointers have been written into the line. Therefore an indication to this effect is written into this line temporarily.)

The evicted line in the first set of lines 30 will have contained pointers 33 to the vertex attribute data 43 in the second set of lines 40 associated with the triangle identified by the tag 31 in the evicted line. It is therefore necessary to decrement the reference counter 42 in the tag 41 in each of the lines in the second set of lines 40 to which these pointers 33 referred (step 107, FIG. 4), as these are no longer linked to this line in the first set of lines 30.

Once these steps have been performed, the second set of lines 40 of the cache 25 are searched for each of the three tags 41 containing the vertex identifiers relating to the vertices for the triangle identified by the new tag 31 in the line in the first set of lines 30 (a look-up table stored in a cache in the other shader core logic 54 is used to return the vertex identifiers associated with the triangle) (step 108, FIG. 4).

For each of the three vertex identifiers being searched for in the second set of lines 40, a similar procedure is carried out as for the search for the polygon identifier in the first set of lines 30. Thus, when the tag 41 containing a particular vertex identifier is present in the second set of lines 40 of the cache 25 (there is a cache "hit", indicating that the vertex attribute data 43 for that vertex is stored in the second set of lines 40), the reference counter 42 in that line of the cache 25 is incremented to indicate that the cache line is now in use (step 109, FIG. 4), i.e. it will now be referred to by another pointer 33 from a line in the first set of lines 30. A pointer 33 to that line in the second set of lines 40 is then written into the allocated line in the first set of lines 30 (step 110, FIG. 4), and the vertex attribute data 43 is returned (step 111, FIG. 4).

(As described above with reference to FIG. 1, vertex attribute data 43 may already be present in the second set of lines 40 of the cache 25 even when there has been a cache miss in the first set of lines 30. Such a scenario may arise, for example, when requesting the vertex attribute data 43 for the triangle labelled with polygon identifier A in FIG. 1, if the vertex attribute data 43 for the triangle labelled with polygon identifier B had previously been requested, written into the second set of lines 40, and the cache lines not yet evicted. In this example, the vertex attribute data 43 corresponding to the vertices labelled with vertex identifiers 1 and 2 would already be present in the second set of lines 40, and the vertex attribute data 43 corresponding to the vertex labelled with vertex identifier 0, i.e. which is unique to the triangle labelled with polygon identifier B, would have to be requested from the Level 2 cache 57 or the main memory 60.)

When the tag 41 containing the vertex identifier for the vertex is not present in the second set of lines 40 of the cache 25 (a cache "miss"), it will be necessary to request the vertex attribute data externally from the cache 25, as will be described below. First, however, it is necessary to create an entry in a line in the second set of lines 40 for the vertex corresponding to the queried vertex identifier, such that when a subsequent query for the vertex attribute data for the same vertex is made, it can be returned quickly from the second set of lines 40 of the cache 25. This can be done confidently, owing to the fully associative nature of the second set of lines to the first set of lines and the ratio of the number of lines in the second set of lines to the number of lines in the first set of lines, i.e. it is guaranteed that a line can be made available for the newly queried vertex.

(As described above, there may, e.g. only be some but not all of the required vertex attribute data missing from the second set of cache lines or, e.g., all the vertex attribute data for a triangle may not be present in the second set of cache lines. For example, with reference to FIG. 1, for a triangle such as that labelled with polygon identifier D, its vertex attribute data 43 may not be present in the first and second set of lines 30, 40 of the cache 25, if the vertex attribute data for that triangle 13 had not previously been requested, or had been subsequently evicted from the cache 25. For this triangle D, because it is isolated from the other triangles A, B, C, its vertices 5, 6, 7 are unique to that triangle D and therefore not shared by any other triangle A, B, C which may have its vertex attribute data 43 currently in the second set of lines 40 of the cache 25. In this example, the vertex attribute data 43 corresponding to the vertices labelled with vertex identifiers 5-7 would have to be requested from the Level 2 cache 58 or the main memory 60.)

The line for the newly queried vertex is created by "evicting" a line in the second set of lines 40 of the cache 25 (step 112, FIG. 4). The line to be evicted is chosen by performing a sequential search down the list of lines in the second set of lines 40, until an inactive cache line (identified by the reference counter 42 in its tag 41 being zero, i.e. the vertex attribute data 43 for the line is not currently in use), is found. The reference counter 42 in the tag 41 for the line in the second set of lines 40 is then incremented to indicate that the line is currently in use (step 113, FIG. 4), i.e. it will now referred to by a pointer 33 from a line in the first set of lines 30, and a pointer 33 to the allocated line for the vertex in the second set of lines 40 is written into the line for the triangle in the first set of lines 30 (step 114, FIG. 4).

Finally, the vertex attribute data 43 which is not currently present in the second set of lines 40 of the cache 25 is requested, from the Level 2 cache 57 on the GPU 52, and is written into the allocated line for the vertex in the second set of lines 40 of the cache 25 (step 115, FIG. 4). (When the requested vertex attribute data 43 is not present in the Level 2 cache 57, then the Level 2 cache 57 first fetches the requested vertex attribute data 43 from the main memory 60.)

Once the vertex attribute data 43 for all three of the vertices of the triangle are present in the second set of lines 40 of the cache 25, they can be read out via the pointers 33 from the line for the triangle in the first set of lines 30 of the cache 25.

It can be seen from the above that in an embodiment, the data entries in the cache are stored in two separate parts of the cache and indexed in two different ways. In a first set of cache lines the data entries are grouped together on a per-polygon basis and tagged with a polygon identifier, and in a second set of lines the data entries are stored on a per-vertex basis and individually tagged with a vertex identifier.

By identifying the data entries in the first set of lines of the cache by the polygons to which vertices are common, only a single query for the polygon identifier needs to be performed to return the vertex attribute data for all the vertices in the polygon, compared with the second set of lines in which separate queries have to be performed for each vertex, i.e. searching for each separate vertex identifier.

The data entries tagged with a common polygon identifier are grouped together, i.e. written in the same line of the first set of lines, so only a single tag is needed for each polygon, which comprises the polygon identifier, compared to the second set of lines in which each data entry has a separate tag comprising a different vertex identifier. This allows queries within the cache to be performed more efficiently when the vertex attributes for the vertices for a particular polygon are required, i.e. because only one polygon identifier needs to be searched for as opposed to multiple different vertex identifiers, as well as reducing the size of the cache, i.e. because the tag for one polygon is smaller than the tags for multiple vertices, both owing to the fact that it only comprises a single identifier and that as there are fewer polygons the identifiers can be written to a shorter data word.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of storing a plurality of pieces of vertex attribute data in a graphics processing system, the graphics processing system being arranged to process a plurality of polygons, the plurality of polygons comprising a plurality of vertices with which the plurality of pieces of vertex attribute data are associated, the method comprising:
    writing, to a line in a first set of lines of a cache, a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries; and
    for the plurality of pieces of vertex attribute data that the line in the first set of lines in the cache relates to, writing, to a line in a second set of lines of the cache, a data entry associated with a piece of vertex attribute data, the piece of vertex attribute data being associated with one of the vertices of the polygon that the line in the first set of lines in the cache relates to, and a tag comprising a vertex identifier to identify the vertex associated with the data entry.

2. A method as claimed in claim 1, wherein the data entries in the second set of lines comprise the vertex attribute data itself, and the data entries in the first set of lines comprise pointers which point to the vertex attribute data stored in the second set of lines.

3. A method as claimed in claim 1, comprising writing, to a line in the first set of lines, a plurality of pointers associated with the plurality of pieces of vertex attribute data and a tag comprising a polygon identifier to identify the polygon associated with the plurality of pieces of vertex attribute data associated with the one or more pointers, and,
    for the plurality of pieces of vertex attribute data, writing, to a line in the second set of lines, a piece of vertex attribute data and a tag comprising a vertex identifier to identify the vertex associated with the piece of vertex attribute data,
    wherein each pointer of the plurality of pointers points to a line in the second set of lines tagged with a vertex identifier associated with a piece of vertex attribute data identified by the polygon identifier for the pointer.

4. A method as claimed in claim 1, comprising writing, to a line in the first set of lines of the cache and to one or more lines in the second set of lines of the cache, a reference counter to track the usage of the vertex attribute data that the line relates to.

5. A method as claimed in claim 1, wherein the polygon identifier identifies a plurality of data entries in the first set of lines of the cache collectively and the vertex identifier identifies the data entries in the second set of lines of the cache individually, wherein the lines in the second set of lines are fully associative to the lines in the first set of lines, and the ratio of the cache lines in the second set of lines to the cache lines in the first set of lines is equal to or greater than the number of pieces of data identified by the polygon identifier.

6. A method of performing a query in a cache for a plurality of pieces of vertex attribute data associated with a polygon, the cache being located in a graphics processing system for processing a plurality of polygons, the plurality of polygons comprising a plurality of vertices with which the plurality of pieces of vertex attribute data are associated;
    the method comprising, when vertex attribute data relating to a polygon is required by the graphics processing system:
    submitting a query to a first set of lines of a cache to search for a tag comprising a polygon identifier for the polygon that the vertex attribute data relates to, and, when the tag is present, returning the data entries associated with the tag, and
    when the tag in the first set of lines of the cache is not present, submitting a query in a second set of lines of the cache to search for the tags comprising the vertex identifiers for the vertices of the polygon, and, for the tags that are present, returning the data entries associated with the tags.

7. A method as claimed in claim 6, wherein, when not all the plurality of pieces of vertex attribute data associated with the polygon identifier are present in the second set of lines, the pieces of vertex attribute data not present in the second set of lines are fetched into the cache.

8. A method as claimed in claim 7, comprising writing the fetched pieces of vertex attribute data to one or more lines in the second set of lines along with a tag comprising a vertex identifier for each piece of vertex attribute data, and writing a set of pointers to a line in the first set of lines that point to the vertex attribute data stored in the second set of lines.

9. A method as claimed in claim 6, wherein, when a tag comprising the queried polygon identifier in the first set of lines is not present, data entries associated with the plurality of pieces of vertex attribute data are written to a line in the first set of lines, along with a tag comprising the polygon identifier to identify the data entries.

10. A method as claimed in claim 6, wherein, following a cache miss for one or more pieces of vertex attribute data identified by a polygon identifier in the first set of lines or identified by a vertex identifier in the second set of lines, and before the data entries associated with the vertex attribute data are written to the cache lines, one or more cache lines are allocated for the data entries in the first set of lines, and one or more cache lines are allocated for the data entries in the second set of lines.

11. A graphics processing system for processing a plurality of polygons, the plurality of polygons comprising a plurality of vertices with which a plurality of pieces of vertex attribute data are associated, wherein the graphics processing system comprises:
a cache comprising a plurality of cache lines each for the storage of data entries, and each having a tag for identifying the data stored in the cache line; and
processing circuitry capable of:
writing, to a line in a first set of lines of the cache, a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries, and
writing, to a line in a second set of lines of the cache, a data entry associated with a piece of vertex attribute data, the piece of vertex attribute data being associated with one of the vertices of a polygon, and a tag comprising a vertex identifier to identify the vertex associated with the data entry.

12. The graphics processing system as claimed in claim 11, wherein the data entries in the second set of lines comprise the vertex attribute data itself, and the data entries in the first set of lines comprise pointers which point to the vertex attribute data stored in the second set of lines.

13. The graphics processing system as claimed in claim 11, comprising processing circuitry capable of:
writing, to a line in the first set of lines, a plurality of pointers associated with the plurality of pieces of vertex attribute data and a tag comprising a polygon identifier to identify the polygon associated with the plurality of pieces of vertex attribute data associated with the one or more pointers; and
writing, for the plurality of pieces of vertex attribute data, to a line in the second set of lines, a piece of vertex attribute data and a tag comprising a vertex identifier to identify the vertex associated with the piece of vertex attribute data;
wherein each pointer of the plurality of pointers points to a line in the second set of lines tagged with a vertex identifier associated with a piece of vertex attribute data identified by the polygon identifier for the pointer.

14. The graphics processing system as claimed in claim 11, comprising processing circuitry capable of writing, to a line in the first set of lines of the cache and to one or more lines in the second set of lines of the cache, a reference counter to track the usage of the vertex attribute data that the line relates to.

15. The graphics processing system as claimed in claim 11, wherein the polygon identifier identifies a plurality of data entries in the first set of lines of the cache collectively and the vertex identifier identifies the data entries in the second set of lines of the cache individually, wherein the lines in the second set of lines are fully associative to the lines in the first set of lines, and the ratio of the cache lines in the second set of lines to the cache lines in the first set of lines is equal to or greater than the number of pieces of data identified by the polygon identifier.

16. A graphics processing system for processing a plurality of polygons comprising a cache for storing a plurality of pieces of vertex attribute data associated with a polygon, the plurality of polygons comprising a plurality of vertices with which the plurality of pieces of vertex attribute data are associated, wherein the cache comprises a plurality of lines each for the storage of data entries, and each having a tag for identifying the vertex attribute a data stored in the cache line;
wherein one or more lines in a first set of lines of the cache are capable of storing a plurality of data entries associated with a plurality of pieces of vertex attribute data, the plurality of pieces of vertex attribute data being associated with the vertices of a polygon, and a tag comprising a polygon identifier to identify the polygon associated with the plurality of pieces of vertex attribute data that are associated with the one or more data entries; and a plurality of lines in a second set of lines of the cache are capable of storing a data entry associated with a pieces of vertex attribute data, the piece of vertex attribute data being associated with one of the vertices of a polygon, and a tag comprising a vertex identifier to identify the vertex associated with the data entry;
wherein the graphics processing system comprises processing circuitry capable of, when vertex attribute data relating to a polygon is required by graphics data processing system:
submitting a query to the first set of lines of the cache to search for a tag comprising the polygon identifier for the polygon that the vertex attribute data relates to, and returning the data entries associated with the tag when the tag is present, and
submitting a query in the second set of lines of the cache to search for the tags comprising the vertex identifiers for the vertices of the polygon when the tag in the first set of lines of the cache is not present, and returning the data entries associated with the tags for the tags that are present.

17. The graphics processing system as claimed in claim 16, wherein the processing circuitry is capable of fetching the pieces of vertex attribute data not present in the second set of lines into the cache when not all the plurality of pieces of vertex attribute data associated with the polygon identifier are present in the second set of lines.

18. The graphics processing system as claimed in claim 17, wherein the processing circuitry is capable of writing the fetched pieces of vertex attribute data to one or more lines in the second set of lines along with a tag comprising a vertex identifier for each piece of vertex attribute data, and writing a set of pointers to a line in the first set of lines that point to the vertex attribute data stored in the second set of lines.

19. The graphics processing system as claimed in claim 16, wherein, when a tag comprising the queried polygon identifier in the first set of lines is not present, data entries associated with the plurality of pieces of vertex attribute data are written to a line in the first set of lines, along with a tag comprising the polygon identifier to identify the data entries.

20. The graphics processing system as claimed in claim 16, wherein the processing circuitry is capable of allocating one or more cache lines for the data entries in the first set of lines, and one or more cache lines for the data entries in the second set of lines, following a cache miss for one or more pieces of vertex attribute data identified by a polygon identifier in the first set of lines or identified by a vertex identifier in the second set of lines, and before the data entries associated with the vertex attribute data are written to the cache lines.

21. A non-transitory computer readable medium storing computer software code which when executing on a processor performs a method of storing a plurality of pieces of vertex attribute data in a graphics processing system, the graphics processing system being arranged to process a plurality of polygons, the plurality of polygons comprising a plurality of vertices with which the plurality of pieces of vertex attribute data are associated, the method comprising:

writing, to a line in a first set of lines of a cache, a plurality of data entries associated with a plurality of pieces of vertex attribute data, the plurality of pieces of vertex attribute data being associated with the vertices of a polygon, and a tag comprising a polygon identifier to identify the polygon associated with the plurality of data entries; and for the plurality of pieces of vertex attribute data that the line in the first set of lines in the cache relates to, writing, to a line in a second set of lines of the cache, a data entry associated with a piece of vertex attribute data, the piece of vertex attribute data being associated with one of the vertices of the polygon that the line in the first set of lines in the cache relates to, and a tag comprising a vertex identifier to identify the vertex associated with the data entry.

22. A non-transitory computer readable medium storing computer software code which when executing on a processor performs a method of performing a query in a cache for a plurality of pieces of vertex attribute data associated with a polygon, the cache being located in a graphics processing system for processing a plurality of polygons, the plurality of polygons comprising a plurality of vertices with which the plurality of pieces of vertex attribute data are associated;

the method comprising, when vertex attribute data relating to a polygon is required by the graphics processing system:

submitting a query to a first set of lines of a cache to search for a tag comprising a polygon identifier for the polygon that the vertex attribute data relates to, and, when the tag is present, returning the data entries associated with the tag, and when the tag in the first set of lines of the cache is not present, submitting a query in a second set of lines of the cache to search for the tags comprising the vertex associated for the vertices of the polygon, and, for the tags that are present, returning the data entries associated with the tags.

* * * * *

UNITED STATES PATENT AND TRADEMARK OFFICE
CERTIFICATE OF CORRECTION

PATENT NO. : 9,965,827 B2
APPLICATION NO. : 14/796979
DATED : May 8, 2018
INVENTOR(S) : Charles et al.

It is certified that error appears in the above-identified patent and that said Letters Patent is hereby corrected as shown below:

In the Claims

Column 24, Line 12 (Claim 16) please change "attribute a data" to -- attribute data --
Column 24, Line 24 (Claim 16) please change "with a pieces" to -- with a piece --

Signed and Sealed this
Twenty-fourth Day of July, 2018

Andrei Iancu
*Director of the United States Patent and Trademark Office*